United States Patent Office 3,655,714
Patented Apr. 11, 1972

3,655,714
PROCESS FOR PREPARING FLUORINE COMPOUNDS FROM ORGANOSILICON COMPOUNDS BY MEANS OF FLUORIDES OF THE FIRST TO THIRD MAIN GROUPS OF THE PERIODIC SYSTEM
Christian Dathe, Radebeul, Germany, assignor to Institut fur Silikon- und Fluorkarbonchemie, Radebeul, Germany
No Drawing. Filed May 20, 1969, Ser. No. 826,259
Int. Cl. C07f 7/12, 7/18
U.S. Cl. 260—448.2 E          11 Claims

ABSTRACT OF THE DISCLOSURE

A process for preparing fluorine compounds from organosilicon compounds having atoms or atom groups exchangeable with fluorine, which comprises reacting said compounds with at least a molar quantity of a difficultly soluble metal fluoride of the first to third main groups of the Periodic System of Elements at about normal temperature in the presence of an inorganic diluted acid which is stronger than hydrofluoric acid, heating the mixture to water-bath temperature, and collecting the fluorine compound escaping from the reaction mixture by condensation. The process has the advantage of dispensing with HF as fluorinating agent, thereby eliminating the use of special acid-resistant equipment and particular safety measures mandatory in operation with HF.

The invention relates to a process in which difficultly soluble metal fluorides of the first to third main groups of the Periodic System of Elements are used as fluorinating agents instead of hydrofluoric acid.

Calcium fluoride is amply and inexpensively available in the form of fluorspar, but it has not been used, or only infrequently, as fluorinating agent because of its poor reactivity. The fluorides of sodium, lithium, magnesium, barium and aluminum, which frequently are obtained as by-products in the industry of fluorine, were likewise seldom used for producing fluorine compounds because of their low reactivity. In water and organic solvents they are only difficultly soluble or completely insoluble.

In order to arrive at fluorinating agents from calcium fluoride, the latter is first treated with concentrated sulfuric acid by heating, whereby hydrofluoric acid is obtained which is either used per se or in the form of antimony-, sodium hydrogen-, ammonium hydrogen fluoride and the like, for the exchange of reactive atoms or atom groups. Only in rare cases it is possible to use directly calcium fluoride and the very aggressive concentrated sulfuric acid. According to known methods calcium fluoride alone is only used at high temperatures (fluorination in the gas phase) and in the presence of catalysts, for instance FeCl₃ as fluorinating agent. In that case the yields of fluorinated product are very poor.

Sodium fluoride, which in the dry state exchanges chlorine for fluorine in the ester chloride of phosphoric acid with an output of 90%, fails in other cases e.g. with ethylene chlorohydrin, chloroaceticmethylester and the like, which is contrary to the reaction with KF. Organochlorosilanes are not attacked by dry sodium fluoride either. When working in water, the chlorine of the above compounds is exchanged by fluorine with a yield of about 60%. Lithium fluoride reacts with fluorine in the chlorohydrin of glycerine when radiated with UV rays at a rate of 52%. As are the other above-named fluorides, it is ineffective against the chlorosilanes in the presence of water. Aluminum fluoride may be used for producing fluorinated carbon compounds in the form of sodiumfluoroluminate at very high temperature, but in that case, too, the yields are very poor.

There is a possibility of using metal fluorides as fluorination agents by liberating HF by the addition of concentrated sulfuric acid, whereby the HF is used as transfer agent for the fluorine. However, due to the aggressiveness of the sulfuric acid, side reactions do often occur which will cause reduction in yields of the desired fluorinated product.

It is an object of the present invention to overcome the disadvantages of the hitherto known processes for replacing HF as fluorinating agent.

It is another object to provide a process for preparing organic fluorine products, which permits to carry out fluorination in apparatus of conventional materials, such as glass, ceramics and the like without particular acid resistance, and to arrive at satisfactory yields and pure reaction products by simple and inexpensive operating procedures.

Other objects and advantages of the process according to the invention will become apparent from the following detailed description.

A process has been discovered in which the difficultly soluble metal fluorides of the first and third main groups of the Periodic System of Elements may be used without simultaneous use of concentrated sulfuric acid in vessels of material such as glass, ceramics or enamel, in other words, in materials which do not have to be resistant to HF, the yields being in this case practically quantitative.

It is a surprising fact that the above-mentioned difficultly soluble metal fluorides are activated by HCl or other diluted acids to such a degree that they become capable of exchanging reactive atoms or atom groups with fluorine and may be used as successfully as HF for the production of organic fluorine compounds.

Thus, according to the invention the compounds to be fluorinated are reacted with the above-mentioned metal fluorides in the presence of diluted acids. It is not important whether the HCl or other acid is added to the metal fluorides or is formed in situ in the reaction of the compound to be fluorinated with the water present, with alcohol or the like. For obtaining high yields, the presence of organic solvents as solubilizing agent is not absolutely necessary, but it is frequently advantageous.

The most accessible fluoride is calcium fluoride. This may be used in the commercially available form, e.g. as ground fluorspar or in the form of calcium fluoride mud which is obtained from de-fluorination plants of HF, containing waste waters. The same is true, in a way, for the other difficultly soluble metal fluorides which though they are more expensive than calcium fluoride, can sometimes be utilized with profit in the process according to the invention, when they are obtained as by-products in chemical reactions. It is advantageous, though not necessary for the reaction, that the fluorinating agent be used in a slight excess.

Thus e.g. organosilanes are converted almost quantitatively into organofluorosilanes when reacted with the above-mentioned metal fluorides suspended in alcohol, to which chlorosilane is added drop by drop. Volatile organofluorosilanes escape in this operation frequently during the dropwise addition. For completing the reaction, the mixture is heated in a water bath to a temperature ranging from 30 to 100° C., preferably 70 to 90° C. for 10 minutes to 5 hours, whereby organofluorosilanes are obtained in purest state and with quantitative yields. If the boiling point of the fluorosilane is higher than that of any other component of the mixture, heating is carried out for a short time and subsequently the organic components are separated, for instance, by distillation.

Diorganodi- and monoorganotrichlorosilanes are preferably first introduced into an anhydrous solvent, e.g. alchol, and the so obtained mixture is then added drop by drop while stirring into a suspension consisting of the metal fluoride, used in any individual case, diluted acid and solubilizing agent. The mixture is subsequently heated in a water bath.

The process according to the invention is not limited to the fluorination of organochlorosilanes, it is applicable in all cases in which up to now fluorine compounds were formed in the reaction with HF. Thus according to the process of the invention e.g. all organosilanes will react which, in addition to an alkyl, alkenyl or aryl group attached to silicon, contain atoms or atom groups capable of being converted into organofluorosilanes with HF. These are in addition to organohalogensilanes: organooxysilanes, organosilazanes and organosilylamines; organosilylester, oganothiosilanes, organosilanols and organosilanolates; organohydrogensilanes, organocyano-, cyanato- and -thiocyanatosilanes, organodi- and -polysilanes, organohalogensiloxanes, organopolysiloxanes and others.

The above organosilanes, too, are preferably added dropwise in pure or dissolved form into a stirred suspension which is composed of the metal fluoride used in each individual case, an acid corresponding to the above definition, and preferably of a solvent, the mixture being then heated in a water bath.

Any conventional organic solvent used in technical processes may be employed such as toluene, benzene, chlorinated hydrocarbons, pentane, hexane and so on. Particularly suitable are alcohols, e.g. ethanol, propanol, butanol and such solvents which are miscible partly or completely with water, e.g. tetrahydrofurane, dioxane, acetonitrile, acetone and others. The solvent may be used pure or mixed with water.

If the acid necessary for carrying out the process according to the invention is not added, but is formed by the reaction of the compound to be fluorinated with water or alcohol, for instance in the fluorination of organochlorosilanes, it is necessary that a quantity of water or alcohol be present which corresponds to the following equation, but which is preferably present in excess:

($n=1$ to 3, R=not exchangeable organogroup, R′=alkyl-group).

The acid necessary in accordance with the invention must be stronger than hydrofluoric acid. Particularly advantageous are hydrogen halides, e.g. HCl, and diluted sulfuric acid. Sometimes other acids corresponding to the above definition may be used, though with less satisfactory yields, for instance diluted acids of halogens, diluted nitric acid, and others.

The amount of acid added or formed in situ has to be equivalent to the amount of atoms or atom groups to be exchanged with fluorine; in case basic groups are present, e.g. $NH_2$, which are to be exchanged, the quantity of acid necessary for their neutralization should be taken into account. However, an excess will not be harmful. The amount of acid is not strictly limited though it should not be below 0.01 N. When the acids, as e.g. hydrochloric acid, form azeotropic mixtures with water, it is preferable when the acid present in the azeotropic mixture has the upper limit concentration.

A particularly good embodiment of the invention for producing organodi- and -trifluorosilanes consists of first adding the chlorosilanes in question dropwise and with stirring into anhydrous alcohol, e.g. butanol, introducing the escaping HCl into an aqueous suspension of the metal fluoride, which already has been acidified with a small amount of hydrochloric acid and to which a solvent, such as butanol has been added, and subsequently adding the chlorosilane-alcohol mixture drop by drop, while stirring, into the metal fluoride suspension.

Since it is possible to split also Si—O—Si bonds and Si—Si bonds by the process according to the invention while obtaining high yields, it is possible to use as starting materials for e.g. preparing methylfluorosilanes the otherwise scarcely useful distillation residues of the methylchlorosilane synthesis, which consist mainly of organopolysilanes and -siloxanes.

The splitting of such products was up to now only possible by two methods: either by the use of HCl, whereby however only Si—Si, but not Si—O—Si bonds could be split with satisfactory yields; or by using HF, whereby both groups could be split with quantitative fluorination but where the use of special acid-proof materials for the reaction vessels and increased safety regulations for the operations spelled difficult working conditions.

As compared to processes using HF as fluorinating agent, the process according to the invention has a number of great advantages. The conventional acid-proof materials such as glass, porcelain, enamel and the like may be used with the metal fluorides since HF is not being directly liberated. Furthermore, the special safety measures for protecting the operators necessary while using HF and other fluorinating agents known up to the present, can be considerably cut down. Also, the waste materials formed in the process of the invention are easier to remove; thus, the waste waters need not be de-fluorinated and the solvents used in the process can be readily recovered.

If, for instance hydrochloric acid is used as activator, the liquid layer formed above the unreacted excess amount of metal fluoride can be easily removed by decantation. The remaining metal fluoride is immediately available for renewed use. It is therefore, contrary to HF, quantitatively utilized. The aqueous saturated metal chloride solution separating in the liquid layer can be worked up further or easily disposed of. If the fluorine compounds prepared are very volatile, such as methylfluorosilane, they escape already during the fluorination process and the solvent, e.g. butanol, can be re-used without purification. In that case the expenses for the material are particularly low; they consist only of compounds to be fluorinated, which are practically nil in the case, when distillation residues or other waste materials, e.g. of the methylchlorosilane synthesis are used, plus the very low costs of the reacted metal fluoride.

The invention will now be more fully explained in a number of examples but it should be understood that these are given by way of illustration and not of limitation and that many changes in the details can be made without departing from the spirit of the invention.

It should be noted that all percentages indicated in the examples are to be understood by weight.

EXAMPLE 1

(a) Into a glass flask provided with stirrer, dropping funnel and reflux cooler, 26 g. ground fluorspar, 135 ml. n-butanol and 25 ml. water were first introduced, and 27 g. trimethylchlorosilane were then added drop by drop while stirring. During subsequent heating of the mixture in a boiling water bath, 20 g. (87%) solid trimethylfluorosilane were condensed in an attached cooling trap maintained at −78° C.; the purity of the product was 99.9%, determined by gas chromatography.

(b) When the test was made without addition of water, the yield was 14.5 g. (63%); purity 99.9%.

EXAMPLE 2

Same manner of fluorination as in Example 1(a), however 135 ml. n-propanol were used with otherwise same amounts of other components. Yield of condensate 28 g. from which 20.5 g. (90%) trimethylfluorosilane of boiling point 16° C. were obtained by distillation.

EXAMPLE 3

As in Example 1(b), no water was used but 26 g. fluorspar and 75 ml. ethanol (96%) were first introduced into a flask, and 27 g. trimethylchlorosilane were then added drop by drop.

From the condensate collected while heating, amounting to 24 g., 17 g. (74%) trimethylfluorosilane were obtained by distillation which were contaminated with 4% ethylchloride; boiling point of the impure trimethylfluorosilane 12.2° C.

If the same amount of trimethylchlorosilane was added to 13 g. fluorospar in 37.5 ml. ethanol to which 12.5 ml. water were added dropwise, 17 g. (74%) trimethylfluorosilane were obtained directly by condensation in purest form.

EXAMPLE 4

In the apparatus described in Example 1(a), 50 g. fluorspar, 50 g. concentrated hydrochloric acid, 50 g. water and 50 g. n-butanol were first introduced in the order indicated, and stirred. After having added 50 ml. n-butanol and 39 g. dimethyl-di-chlorosilane drop by drop, and having heated for 1.5 hours in a boiling water bath, 29 g. (100%) dimethyldifluorosilane of 99.4% purity were obtained by condensation.

EXAMPLE 5

As in Example 4, 50 g. fluorspar, 50 g. conc. hydrochloric acid, 50 g. water and 50 g. dioxane were first introduced and thereafter amixture of 30 g. methyltrichlorosilane and 50 ml. n-butanol added dropwise. Upon heating, 20 g. (100%) of methyltrifluorosilane of 94% purity were obtained by condensation.

EXAMPLE 6

The HCl escaping upon adition of 30 g. methyltrichlorosilane into 50 ml. n-butanol was passed into a suspension of 50 g. fluorspar, 10 g. conc. hydrochloric acid, 90 g. water and 50 ml. dioxane, and the mixture of butanol and methyltrichlorosilane subsequently added drop by drop into a suspension of $CaF_2$ in hydrochloric acid. Upon heating, 17 g. (85%) of methyltrifluorosilane were obtained by condensation, which solidified at −78° C.

EXAMPLE 7

Into a mixture containing 50 g. unused fluorspar recovered from the compounds reacted in Example 5, 50 g. conc. hydrochloric acid, 50 ml. water and 50 ml. n-butanol, likewise recovered from fluorinating test and re-used without purification, we introduced drop by drop a mixture of 50 ml. anhydrous n-butanol and 30 g. methyltrichlorosilane. Upon heating, 20 g. methyltrifluorosilane were obtained by condensation. Distillation yielded 19 g. (95%) of the pure product.

EXAMPLE 8

43 g. phenyltrichlorosilane were introduced with cooling into 50 ml. n-butanol and the mixture was added dropwise into a suspension of 50 g. fluorspar, 50 g. conc. hydrochloric acid, 50 ml. butanol and 50 ml. water. After heating for 3 hours in a boiling water bath the organic layer was separated, dried with $Na_2SO_4$ and subjected to fractional distillation. At 101 to 110° C., 22.5 g. (70%) phenyltrifluorosilane were obtained by distillation, which was contaminated by butanol; identification of the phenyltrifluorosilane was made by formation of a yellow compound $(C_6H_5Ag)_2AgNO_3$ which resulted from the addition of $AgNO_3$- and $NH_4F$-solutions.

EXAMPLE 9

A solution of 36 g. methyltriethoxysilane in 50 ml. n-butanol was added dropwise to a suspension of 50 g. fluorspar, 125 ml. 25% sulfuric acid and 50 ml. dioxane. Upon subsequent heating, 20 g. (100%) methyltrifluorosilane were obtained by condensation, which had a purity of 92%.

EXAMPLE 10

In the same manner as described in Example 9, 38 g. vinyltriethoxysilane were reacted; 18 g. (80%) vinyltrifluorosilane were obtained by condensation, having a purity of 92%.

EXAMPLE 11

In the manner described in Example 9, 50 g. methyltributoxysilane were reacted. Condensation yielded 16.5 g. (83%) methyltrifluorosilane solidified at −78° C.

EXAMPLE 12

To 20 g. fluorspar, 75 g. 25% sulfuric acid and 50 ml. dioxane, a mixture of 50 ml. n-butanol and 16 g. hexamethyldisilazane was added drop by drop. By distillation of the 20 g. condensate formed upon heating, 18 g. (98%) of pure trimethylfluorosilane were obtained, boiling point 16° C.

EXAMPLE 13

Into a suspension of 20 g. fluorspar, 125 g. 25% sulfuric acid and 50 ml. dioxane, a solution of 44 g. methyltriacetoxysilane $CH_3Si(OOCCH_3)_3$ in 50 ml. n-butanol was added drop by drop. After heating, 14.5 g. (97% calculated on $CaF_2$) of methyltrifluorosilane were obtained.

EXAMPLE 14

Into a suspension of 30 g. fluorspar, 125 g. 25% sulfuric acid and 50 ml. n-butanol, a solution of 18 g. trimethylsilanol in 50 ml. n-butanol was added drop by drop. Upon heating, 18.5 g. (100%) trimethylfluorosilane were obtained which solidified at −78° C.; purity of the product 98%.

EXAMPLE 15

To the mixture described in Example 5, I added 23 g. methyldichlorosilane $CH_3SiHCl_2$. Yield of crude trimethylfluorosilane 20 g. (100%). By distillation I obtained 18 g. (90%) of the pure product, boiling point 16° C.

EXAMPLE 16

45 g. of a fraction of the distillation residues of the methylchlorosilane synthesis, boiling at 155 to 160° C. and containing mainly methylchlorodi-silanes, were reacted as described in Example 5. Obtained were 28.5 g. (63.5%) of condensed, highly volatile methylfluorosilanes consisting of methyltri-, dimethyldi- and trimethyl-

EXAMPLE 17

In a manner similar to Example 16, 45 g. of a distillation residue of the methylchlorosilane synthesis were reacted, containing among others compounds with Si—Si and Si—O—Si bonds; analysis of the stirring material 18.2% Si, 42.5% Cl. Obtained were 14.5 g. (32.3%) highly volatile methylfluorosilanes, containing methyltri-, dimethyldi- and trimethylfluorosilanes in the ratio of 40:38:6.

When the same compound was split in a known manner with 40% HF, highly volatile methylfluorosilanes were obtained in a yield of 32.5% whereas splitting with HCl, which generally only reacts with the Si—Si bond, only 12% of methylchlorosilanes were split off which boiled below 70° C.

EXAMPLE 18

A solution of 16.5 g. hexamethyldisiloxane $(CH_3)_3 \cdot SiOSi(CH_3)_3$ in 50 ml. n-butanol, were added dropwise into a stirred solution of 30 g. fluorspar in 50 g. conc. hydrochloric acid and 50 ml. water. During the procedure, already 8 g. (41%) trimethylfluorosilane were obtained by condensation. After heating for one hour in the water bath, the yield was quantitative (19 g., 91%); boiling point 16° C., purity 99.8%.

EXAMPLE 19

A solution of 22.5 g. octamethyltetrasiloxane ($D_4$) in 50 ml. of n-butanol were added dropwise into a stirred suspension of 50 g. fluorospar in 75 g. conc. hydrochloric acid and 75 ml. water. After 30 minutes heating in the water bath the yield in dimethyldifluorosilane was 28 g. (97%). Boiling point 2.5° C., purity 99.4%.

EXAMPLE 20

50 g. fluorospar, 50 g. conc. hydrochloric acid, 50 ml. water and 100 ml. toluene were first introduced into a flask, and 30 g. methyltrifluorosilane mixed with 50 ml. n-butanol added dropwise while stirring. In the subsequent heating in the water bath 19 g. (95%) of a product were obtained from which 17 g. (85%) pure methyltrifluorosilane could be obtained by distillation. Boiling point —30° C.

EXAMPLE 21

Into a glass flask equipped with stirrer, dropping funnel and reflux cooler, 52 g. sodium fluoride and 150 ml. 96% ethanol were first introduced and 108 g. trimethylchlorosilane added drop by drop. After the addition was complete, 32 g. (35%) trimethylfluorosilane have already collected in an attached trap cooled to —78° C. After heating in the water bath, with refluxing, the yield was 92 g. (100%). Distillation of the crude product yielded 84 g. (91%) of trimethylfluorosilane; boiling point 16° C. (literature 16.4° C.).

If the test was made in 150 ml. water instead of ethanol, other conditions remaining equal, the yield in crude product was 57 g. (62%), after distillation 53 g. (58%).

EXAMPLE 22

Into the device described in Example 21, we introduced first 17 g. technical grade aluminum fluoride (fluorine contents 58%), 100 ml. n-propanol and 25 ml. water, and added drop by drop 22 g. trimethylchlorosilane within 10 minutes. Upon heating in the water bath 18.5 g. (100%) trimethylfluorosilane were obtained by condensation, solid at —78° C. Distillation yielded 16.5 g. (90%) of the pure product.

EXAMPLE 23

To a suspension of 50 g. magnesium fluoride, 50 g. conc. hydrochloric acid, 50 ml. water and 50 ml. n-butanol, we added dropwise a mixture of 39 g. dimethyldichlorosilane and 50 ml. n-butanol. Upon subsequent heating in a boiling water bath 31.5 g. of dimethyldifluorosilane were obtained by condensation. Distillation yielded 28 g. (97%) dimethyldifluorosilane of boiling point 2.5° C. (lit. 2.7° C.), purity 100%.

EXAMPLE 24

To a suspension of 105 g. barium fluoride, 50 g. conc. hydrochloric acid, 50 ml. water and 50 ml. dioxane, we added drop by drop a mixture of 30 g. methyltrichlorosilane and 50 ml. n-butanol. Upon subsequent heating in a boiling water bath 20 g. (100%) methyltrifluorosilane were obtained by condensation, which yielded by distillation 19 g. (95%) of the pure product having a boiling point of —30° C. (lit. —30.2° C.).

EXAMPLE 25

In the same manner as described in the foregoing example, 38 g. vinyltrichlorosilane were reacted. Obtained by condensation were 14.5 g. (65%) vinyltrifluorosilane which by distillation yielded 13.5 g. (60%), boiling point —16° C. (lit. —15° to —16° C.).

EXAMPLE 26

43 g. phenyltrichlorosilane were introduced while cooling into 50 ml. n-butanol, and the mixture was added dropwise to a suspension of 26 g. lithium fluoride, 50 g. conc. hydrochloric acid, 50 ml. water and 50 ml. n-butanol. After 3 hours heating in a boiling water bath while stirring, the organic layer was separated, dried with sodium sulfate and fractionated. At 100 to 110° C. 29 g. (90%) phenyltrifluorosilane distilled over, still contaminated with butanol which was identified by formation of a yellow compound $(C_6H_5Ag)_2AgNO_3$ upon addition of $AgNO_3$- and $NH_4F$-solutions.

EXAMPLE 27

105 g. barium fluoride, 100 g. conc. hydrochloric acid, 100 ml. water and 75 ml. n-butanol were introduced in the given order and thereto was added a solution of 36 g. methyltriethoxysilane $CH_3Si(OC_2H_5)_3$ in 50 ml. n-butanol, drop by drop. Upon heating in the boiling water bath 18.5 g. (93%) methyltrifluorosilane were obtained by condensation at —30° C., which had a constant boiling point (—30° C.).

EXAMPLE 28

40 g. barium fluoride were first introduced with 75 g. 25% sulfuric acid and 50 ml. dioxane, and a mixture of 24 g. dimethylaminotrimethylsilane $(CH_3)_2NSi(CH_3)_3$ in 50 ml. n-butanol was added dropwise. The yield of trimethylfluorosilane after heating the mixture in the boiling water bath and distillation of the collected condensate was 13 g. (71%), boiling point 16° C. (purity 96.9%).

EXAMPLE 29

50 g. magnesium fluoride, 125 g. 25% sulfuric acid and 50 ml. dioxane were first introduced, and a solution of 44 g. methyltriacetoxysilane $CH_3Si(OOCCH_3)_3$ in 50 ml. n-butanol was added dropwise while stirring. Upon heating in a boiling water bath, 15.6 g. (78%) methyltrifluorosilane were obtained by condensation.

EXAMPLE 30

15 g. lithium fluoride were stirred in 125 g. 25% sulfuric acid, and 50 ml. n-butanol and 18 g. trimethylsilanol dissolved in 50 ml. n-butanol were added dropwise. The condensate, collected after 30 minutes heating in a boiling water bath, yielded upon distillation 18 g. (98%) trimethylfluorosilane. Purity 99.9%, boiling point 16° C.

EXAMPLE 31

23 g. methyldichlorosilane $CH_3SiHCl_2$ were introduced while stirring into 50 ml. n-butanol, and the mixture, likewise while stirring, was added dropwise to a suspension of 50 g. magnesium fluoride, 50 g. conc. hydrochloric acid, 50 ml. water and 50 ml. dioxane, whereby hydrogen escaped, determined as oxyhydrogen gas; at —78° C., 2 ml. condensate were collected. The amount of condensate after heating in the boiling water bath increased to 21 g., and yielded upon distillation 18 g. (90%) pure methyltrifluorosilane, boiling point —30° C.

EXAMPLE 32

45 g. of a distillation residue of the methylchlorosilane synthesis (analysis 18.2% Si, 42.5% $Cl_2$), containing among others Si—Si and Si—O—Si bonds, were mixed with 50 ml. n-butanol and then added dropwise to a suspension of 26 g. lithium fluoride, 50 g. conc. hydrochloric acid, 50 ml. water and 50 ml. dioxane, and thereafter heated in a boiling water bath. 13.5 g. (30%) highly volatile methylfluorosilanes were collected containing methyltri-, dimethyldi- and trimethylfluorosilane in the ratio of 41:36:3.

When the same substance was split in a known manner with 40% HF, the yield in highly volatile methylfluorosilanes was 32.5%, whereas with HCl, which reacts mainly with the Si—Si bond, only 12% methylchlorosilanes were split off which boiled below 70° C.

EXAMPLE 33

A solution of 16.5 g. hexamethyldisiloxane $(CH_3)_3SiOSi(CH_3)_3$ in 50 ml. n-butanol was added dropwise to a stirred suspension of 40 g. $AlF_3$, 75 g. conc. hydrochloric acid and 75 ml. water. Upon subsequent heating we obtained by condensation 18 g. (98%) trimethylfluorosilane, solid at −78° C., boiling point 16° C., purity 100%.

EXAMPLE 34

As in Example 33, 22.5 g. octamethyltetrasiloxane ($D_4$) were reacted. Obtained were by condensation 28 g. (97%) dimethyldifluorosilane, boiling point 2.5° C. (lit. 2.7° C.), purity 100%.

It should be understood, of course, that the foregoing disclosure relates only to preferred embodiments of the invention and that it is intended to cover all changes and modifications of the examples described which do not constitute departures from the spirit and scope of the invention as set forth in the appended claims.

It may be added that this application is closely related to the same inventor's co-pending application, filed concurrently herewith, and entitled "Process for the Recovery of Trimethylfluorosilane from a Mixture of Silicontetrachloride, Trimethylchlorosilane and Hydrocarbons Boiling at the same Range," Ser. No. 826,265.

What I claim is:

1. A process for preparing methyl, vinyl or phenyl silicon fluorides from methyl, vinyl or phenyl silicon compounds having atoms or atom groups attached to silicon which are exchangeable with fluorine, which comprises the steps of reacting said compounds with at least a molar amount of a metal fluoride of the first to third main groups of the Periodic System of Elements, said fluoride being difficultly soluble in water and mixtures of water with mineral acids, at about normal temperature in the presence of an inorganic diluted acid which is stronger than hydrofluoric acid in water and organic solvents, heating the mixture to a water-bath temperature in the range from 30 to 100° C. for about 10 minutes to 5 hours, and collecting the methyl, vinyl or phenyl silicon fluorides from the reaction mixture.

2. The process as defined in claim 1, which comprises carrying out the fluorination reaction in the presence of an organic solvent miscible with water.

3. The process as defined in claim 1, wherein the acid is a hydrogen halide and the solvent is an aliphatic alcohol.

4. The process as defined in claim 3, wherein the acid is diluted hydrochloric acid.

5. The process as defined in claim 1, wherein the acid is diluted sulfuric acid.

6. The process as defined in claim 1, wherein a volatile methyl or vinyl silicon fluoride is prepared which escapes from the reaction mixture and is collected by condensation.

7. The process as defined in claim 1, wherein a nonvolatile phenyl silicon fluoride is prepared which is obtained from the reaction mixture by separation and fractional distillation.

8. The process as defined in claim 1, wherein the starting materials are methyl, vinyl or phenyl chlorosilanes, respectively.

9. The process as defined in claim 8, wherein the starting materials are distillation residues of the methylchlorosilane synthesis, which contain Si—Si bonds and Si—O—Si bonds capable of being split and which yield methylfluorosilanes.

10. A process for preparing volatile methyl or vinyl fluorine compounds from methyl or vinyl chlorosilanes, respectively, which comprises adding said chlorosilanes to a solvent at about room temperature and thereafter introducing the mixture formed drop by drop into a suspension of a fluoride of a metal of the first to third main groups of the Periodic System of Elements, in a dilute hydrochloric or sulfuric acid and an organic solvent, heating the suspension to a temperature ranging from 70 to 90° C. in a boiling water bath for 10 minutes to 5 hours, collecting the escaping fluorine compound by condensation, and preparing the purified product by distillation.

11. The process as defined in claim 10, wherein methylfluorosilanes are prepared from methylchlorosilanes, which comprises carrying out the process in aqueous-alcoholic solution with $CaF_2$ and diluted hydrochloric acid which is prepared in situ.

References Cited

Eaborn, "Organosilicon Compounds," Academic Press, Inc., N.Y. (1960), p. 174.

JAMES E. POER, Primary Examiner

P. F. SHAVER, Assistant Examiner

U.S. Cl. X.R.

260—448.8 R

UNITED STATES PATENT OFFICE
CERTIFICATE OF CORRECTION

Patent No. 3,655,714         Dated  April 11, 1972

Inventor(s) Christian Dathe

It is certified that error appears in the above-identified patent and that said Letters Patent are hereby corrected as shown below:

Column 6, after line 47 (last line of Example 16), add -- fluorosilane in a weight ratio of 75:19:6. --.

Signed and sealed this 15th day of August 1972.

(SEAL)
Attest:

EDWARD M. FLETCHER, JR.          ROBERT GOTTSCHALK
Attesting Officer                Commissioner of Patents